United States Patent [19]

Miyoshi

[11] Patent Number: 5,233,695

[45] Date of Patent: Aug. 3, 1993

[54] MICROPROCESSOR WITH A RECUCED SIZE MICROPROGRAM

[75] Inventor: Akio Miyoshi, Ome, Japan

[73] Assignee: Kabushiki Kaisha Toshiba, Kawasaki, Japan

[21] Appl. No.: 552,841

[22] Filed: Jul. 16, 1990

Related U.S. Application Data

[63] Continuation of Ser. No. 154,282, Feb. 10, 1988, abandoned.

[30] Foreign Application Priority Data

Mar. 31, 1987 [JP] Japan .................................. 62-79152

[51] Int. Cl.$^5$ .............................................. G06F 9/22
[52] U.S. Cl. .................................... 395/375; 395/400;
395/775; 364/231.0; 364/232.8; 364/262.4;
364/262.8; 364/262.81; 364/DIG. 1;
364/946.2; 364/946.6; 364/DIG. 2
[58] Field of Search ... 364/900 MS File, 200 MS File;
395/375, 400, 775, 575, 725

[56] References Cited

U.S. PATENT DOCUMENTS

| 4,080,648 | 3/1978 | Asano et al. ........................ 395/375 |
| 4,236,206 | 11/1980 | Strecker et al. ..................... 395/375 |
| 4,363,091 | 12/1982 | Pohlman, III et al. ............. 395/400 |
| 4,554,627 | 11/1985 | Holland et al. ..................... 395/375 |
| 4,616,313 | 10/1986 | Aoyagi ................................ 395/375 |
| 4,807,113 | 2/1989 | Matsumoto et al. ................ 395/375 |
| 4,812,972 | 3/1989 | Chastain et al. .................... 395/375 |
| 4,835,679 | 5/1989 | Kida et al. .......................... 395/375 |

Primary Examiner—David L. Clark
Assistant Examiner—Maria N. Van Buhr
Attorney, Agent, or Firm—Foley & Lardner

[57] ABSTRACT

When a data processing instruction is given to a microprocessor, and the code of a data register subject to designation is held in an instruction register, a first logic level is outputted from the instruction code decoder, but when the register subject to designation is the instruction queuing register in which a subsequent instruction code is to be held, a second logic level is outputted from the instruction code decoder. By the operation of logic switching means, when the first logic level is being outputted, the register select code decoder can select the data register designated, while when the second logic level is being outputted, the register select code decoder can select the instruction queuing register designated. Accordingly, this eliminates the necessity of carrying out the designation of a data register or queuing register in the microprogram, thus making it possible to reduce the size of the microprogram used.

4 Claims, 2 Drawing Sheets

MICROPROCESSOR WITH A RECUCED SIZE MICROPROGRAM

This application is a continuation of application Ser. No. 07/154,282, filed Feb. 10, 1988 now abandoned.

BACKGROUND OF THE INVENTION

This invention relates to a microprocessor, and more particularly to a microprocessor operating with a microprogram.

In a microprocessor operating with a microprogram., when various instructions (e.g., transfer instructions) are provided for a register, it is necessary to designate where the data, which specifies a register subject to designation, is held by the microprogram. Because an instruction code of a unit length is 8 (eight) bits, e.g., in a microprocessor of 8 bits, where all of the transfer instructions can be represented by the 8 bits of the unit length, one transfer instruction can be represented using an instruction code of unit length. The instance where transfer is conducted from a specific data register to the accumulator, or the like corresponds to this example. In the contrast, where one transfer instruction cannot be completely represented using an instruction code of unit length, it must be represented using an instruction code of a plurality of unit lengths. The instance where constants in the program are transferred to the accumulator corresponds to this example. In the case of the former example, the names of registers subject to designation are held in the instruction register. In contrast, in the case of the latter example, the name of the register subject to designation is held in the instruction queuing register in which the subsequent instruction code is held. Accordingly, such designations were made in the conventional microprocessor.

There are a large number of instructions for specifically designating the registers to be designated, e.g., add instruction, subtract instruction, etc. in addition to the transfer instruction as referred to in the above-mentioned examples. Accordingly, since instructions related to registers to be designated have been conventionally provided in the microprogram, there has occurred the problem that the size of the microprogram becomes large.

SUMMARY OF THE INVENTION

An object of this invention is to provide a microprocessor capable of minimizing the size of the microprogram used.

To achieve this object, this invention provides a microprocessor comprising an instruction register for holding a unit length of an instruction code, an instruction code decoder for decoding the instruction code in the instruction register, an instruction processing unit for executing an instruction decoded by the instruction code decoder, a ROM unit storing a microprogram in which a microprogram for providing a microcode corresponding to the instruction code is stored, a microcode decoder for decoding a microcode produced according to the microprogram stored in the ROM unit storing a microprogram, and a register select code decoder for selecting a data register on the basis of a register code held as a portion of the instruction code in the instruction register to give a designation or instruction when a designation for a register is given from the microcode decoder, characterized in that the instruction code decoder is caused to output a first logic level when a designation for a register corresponding to the register code held as a portion of the instruction code in the instruction register is decoded, and to output a second logic level when a designation for data of an instruction code subsequent to the instruction code held in the instruction register is decoded, and characterized in that there is provided logic switching means for giving a designation or instruction for the data register to the register select code decoder when the instruction code decoder is outputting the first logic level, (and for giving a designation or instruction to an instruction queuing register in which the subsequent instruction code is held when the instruction code decoder is outputting the second logic level.

In accordance with the microprocessor according to this invention, when the name of the register subject to designation is held in the instruction register, the first logic level is outputted from the instruction code decoder. On the other hand, when the register subject to designation is the instruction queuing register in which the subsequent instruction code is held, the second logic level is outputted from the instruction code decoder. By operation of the logic switching means, the register select code decoder makes it possible to select the data register to give a designation or instruction when the first logic level is being output, and to select the instruction queuing register to give a designation or instruction when the second logic level is being output. Accordingly, this eliminates the necessity of giving a designation or instruction related to the register subject to designation on the microprogram, thus making it possible to reduce the size of a microprogram used.

DESCRIPTION OF THE PREFERRED EMBODIMENT

Figure 1:
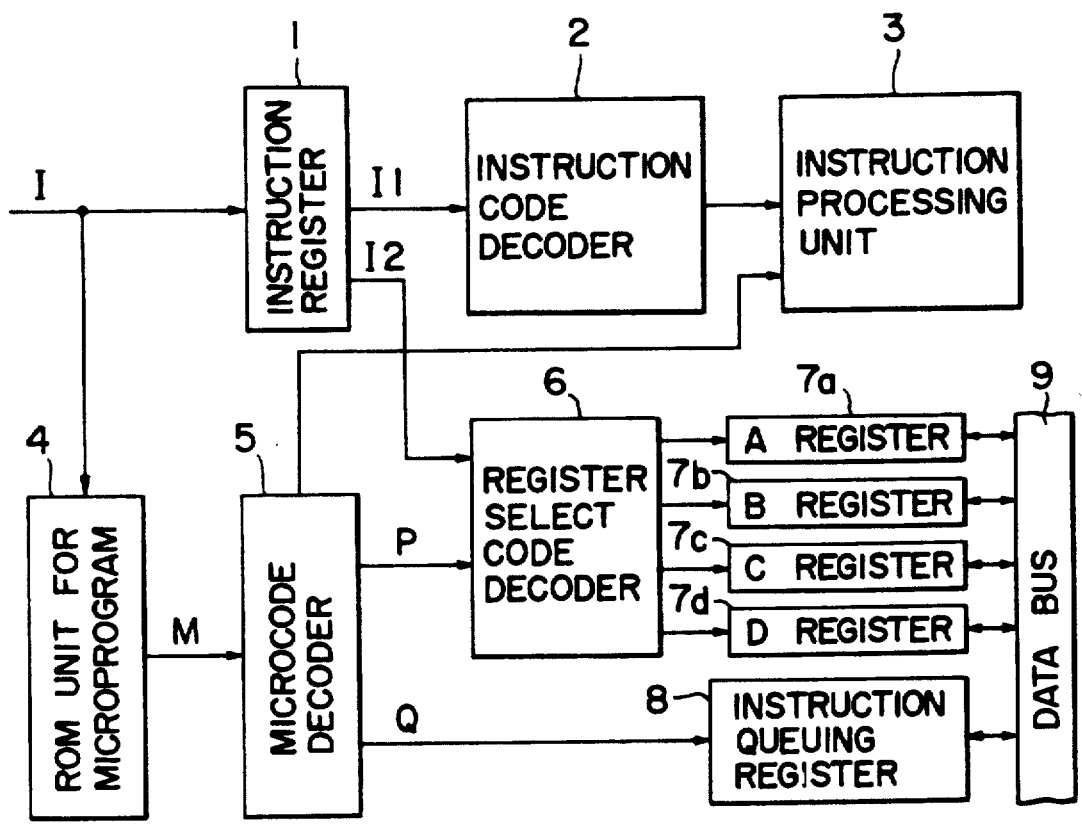
FIG. 1 is a block diagram showing the configuration of a conventional typical microprocessor.

This invention will be now described in connection with a preferred embodiment shown. To clarify the feature of the microprocessor according to this invention, the configuration of the conventional typical microprocessor and the operation thereof will be first described briefly. FIG. 1 is a block diagram showing an example of the configuration of the conventional microprocessor. The microprocessor shown in this figure includes an instruction register 1 for holding an instruction code I of a unit length, an instruction code decoder 2 for decoding the instruction code from the instruction register 1, an instruction processing unit 3 for executing an instruction decoded by the instruction code decoder 2, a ROM unit 4 storing a microcode M corresponding to the instruction code I, and a microcode decoder 5 for decoding the microcode M produced according to the microprogram stored in the ROM unit 4 storing a microprogram. This microprocessor further includes a register select code decoder 6 for selecting a data register 7a-7d on the basis of a register code 12 held as a portion of the instruction code I in the instruction register 1 when a designation for the register is given from the microcode decoder 5, thus to give a designation or instruction, a data register 7 (including A to D registers, the A register serving as an accumulator) which receives designations from the register select code decoder 6, an instruction queuing register 8 for holding the subsequent instruction code, and a data bus 9 for outputting and inputting data to and from respective registers.

Figure 2A:
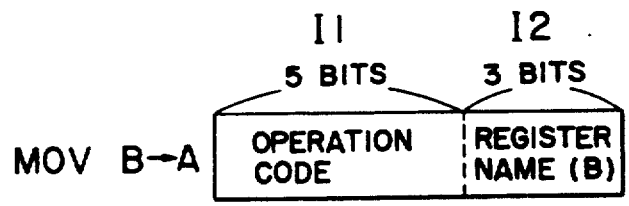
FIG. 2 is a view showing an example of a typical instruction code.
Figure 2B:
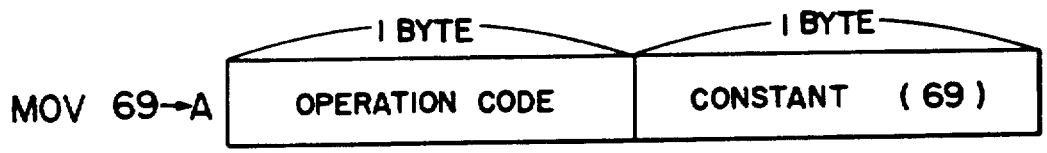

How respective instructions are executed by the microprocessor shown in FIG. 1 in connection with the transfer instruction code of one byte (unit length) as shown in FIG. 2(a) and the transfer instruction code of two bytes as shown in FIG. 2(b) will be explained. FIG. 2(a) shows MOV B→A, i.e., the instruction code to transfer data in the B register 7b to the A register 7a (accumulator). This instruction code is composed of an operation code of five bits and a register code of three bits. The operation code shows the instruction to transfer data from a specific data register 7 to the accumulator. For the register code, the name of the B register is indicated in this example. On the other hand, FIG. 2(b) shows MOV 69→A, i.e., the instruction code to transfer a constant 69 to the A register 7a. In this case, since one byte is used for expression of the constant 69, the instruction code has two bytes in total.

Figure 3A:
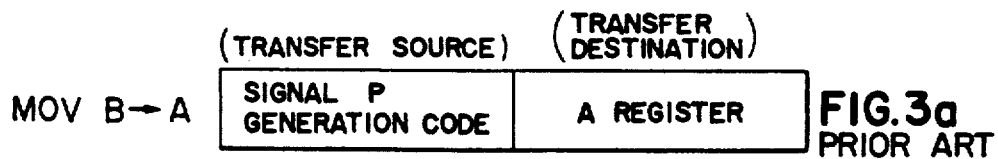
FIG. 3 is a view showing an example of a microcode in the conventional device.
Figure 3B:
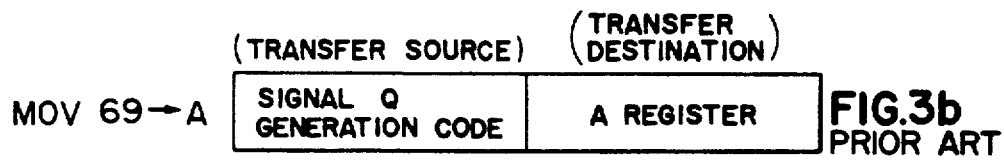

In the ROM unit 4 storing a microprogram, microcodes corresponding to respective instruction codes are memorized or stored. Accordingly, for example, when the code of MOV B→A is given as the instruction code I, the microcode M as shown in FIG. 3(a) is given to the microcode decoder 5. In addition, when the code of MOV 69→A is given, the microcode M as shown in FIG. 3(b) is given to the microcode decoder 5. Each of these microcodes M is composed of data of plural fields wherein the first field consists of data related to the transfer source and the second field consists of data related to the transfer destination. The transfer destinations both indicate the A register. The signal P generation code and the signal Q generation code which are indicative of the transfer source are data to generate signals P and Q, respectively, wherein the signal P shows that the transfer source is one of the data registers 7a to 7d and the signal Q shows that the transfer source is the instruction queuing register 8.

The instruction code I given to the instruction register 1 is decoded at the instruction code decoder 2. The instruction code I thus decoded is executed at the instruction processing unit 3 with the signal from the microcode decoder 5 being added to the instruction processing unit 3. The register code I2 of the instruction code I is given to the register select code decoder 6. Accordingly, where the instruction code of MOV B→A as shown in FIG. 2(a) is given, data of three bits indicating the B register will be given to the register select code decoder 6. At this time, since the microcode M as shown in FIG. 3(a) has been given to the microcode decoder 5, only the signal P is generated from the microcode decoder 5. The register select code decoder 6 receives this signal P to select and designate one of the data registers 7. Since the register code I2 indicates the B register in the case of this example, the data register 7b is selected and designated. Upon receiving this designation, the data register 7b outputs data held therein to the data bus 9. In addition, since it is indicated at the second byte of the microcode M that the transfer destination is the A register, the A register which has received the selective designation from the register select code decoder 6 takes in data on the data bus 9. In a manner stated above, the code of MOV B→A is executed.

On the other hand, where the instruction code of MOV 69→A as shown in FIG. 2(b) is given, the operation codes of the first byte are all given to the instruction code decoder 2 and are then decoded thereat. At this time, since the microcode M as shown in FIG. 3(b) has been given to the microcode decoder 5, only the signal Q is generated from the microcode decoder 5. Accordingly, the register select code decoder 6 carries out neither selection nor designation of the data register 7 as the transfer source. Since the signal Q makes a designation for the instruction queuing register 8, one byte of the next instruction code held at the instruction queuing register 8, i.e., the constant 69 of the second byte in FIG. 2(b) is outputted to the data bus 9. The constant thus outputted is taken into the A register. In a manner stated above, the code of MOV 69→A is executed.

An explanation has been made in connection with the configuration of the conventional microprocessor and the operation thereof. As previously described, because individual microcodes must be prepared for various instruction codes, respectively, as shown in FIG. 3, there occurs the problem that the size of the microprogram becomes large. In view of this, this invention has solved such a problem by employment of the following configuration.

Figure 4:
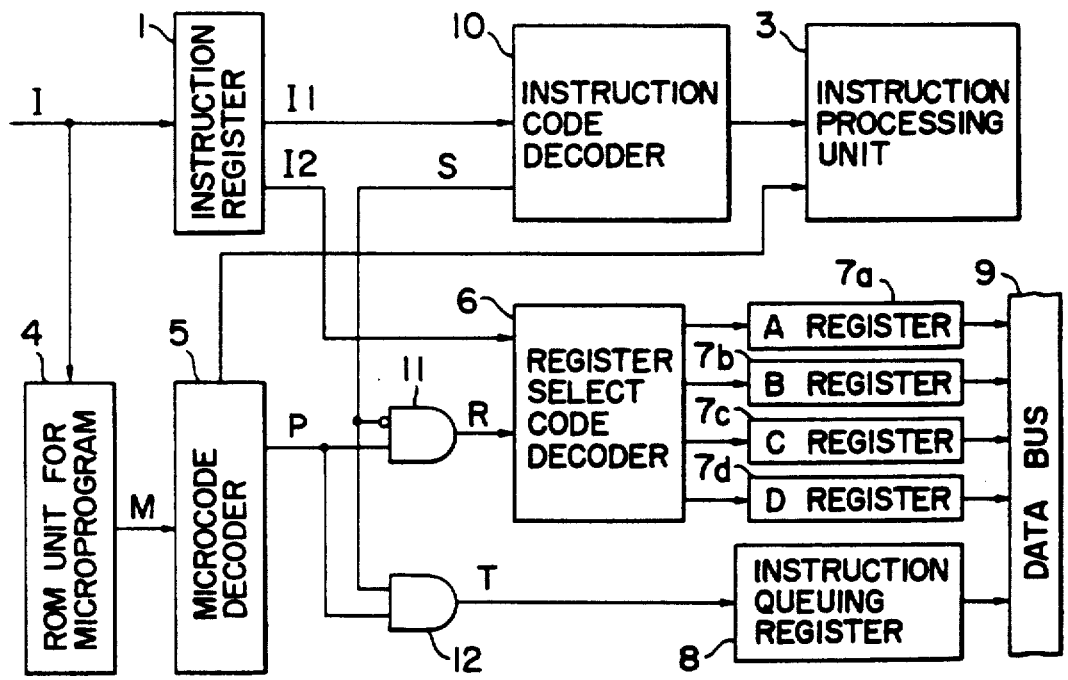
FIG. 4 is a block diagram showing the configuration of a microprocessor according to an embodiment of this invention.

FIG. 4 is a block diagram showing the configuration of a microprocessor according to an embodiment of this invention wherein components identical to those in the conventional device shown in FIG. 1 are designated by the same reference numerals, respectively, and their explanation will be omitted. This device is characterized in that the instruction code decoder 10 outputs a signal S which is delivered to two AND circuits 11 and 12. These two AND circuits 11 and 12 constitute logical switching means to output only either a signal R or a signal T.

When the instruction code decoder 10 decodes a designation for the register corresponding to the register code held in the instruction register, viz., it decodes the instruction code as shown in FIG. 2(a), it output logic "0". In addition, when the instruction code decoder 10 decodes a designation for data of instruction code subsequent to the instruction code held in the instruction register 1, viz., it decodes the instruction code as shown in FIG. 2(b), it outputs logic "1". Since the input logic on the side of the signal S of the AND circuit 11 is inverted, where the signal P is outputted from the microcode decoder 5, when the signal S represents logic "0", the signal R will be outputted, while when the signal S represents logic "1", the signal T will be outputted.

Reference will be made in connection with the case where the instruction code I of MOV B→A is inputted as shown in FIG. 2(a). In such a case, the operation code I1 and the register code I2 are given to the instruction code decoder 10 and the register select code decoder 6, respectively. Since the instruction code decoder 10 outputs logic "0" as the signal S, if the signal P is outputted, the signal R is given to the register select code decoder 6. Since the register code I2 indicates the B register, the register select code decoder 6 selects and designates the B register. Thus, the content of the B register is outputted to the data bus 9 and is transferred to the A register.

On the other hand, when reference is made to the operation of the case where the instruction code I of MOV 69→A is inputted as shown in FIG. 2(b), the operation codes of the first byte are all given to the instruction code decoder 10. Since the instruction code decoder 10 outputs logic "1" as the signal S, if the signal P is outputted the signal R is not given to the register select code decoder 6, but the signal T is given to the instruction queuing register 8. Accordingly, the content of the instruction queuing register 8, i.e., the constant, data of the second byte shown in FIG. 2(b) is inputted to the data bus 9 and is then outputted to the A register.

Figure 5:
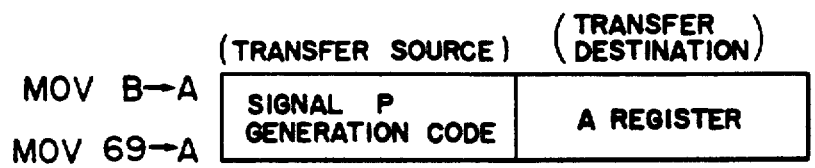
FIG. 5 is a view showing an example of a microcode in the device according to this invention.

For the signal P, it is sufficient that the signal P is outputted in both the cases of the above-mentioned transfer instructions. Namely, it is not necessary to alter the signal P in regard to the above-mentioned two transfer instructions. As shown in FIG. 5, this indicates that both the transfer instruction of MOV A→B and the transfer instruction of MOV 69→A use the microcode M for generating the signal P in regard to the transfer source. With the conventional device, individual microcodes M were required to be generated as shown in FIG. 3, respectively. In contrast, there is no necessity of doing so with the device of this invention.

While the operation of the microprocessor according to this invention has been described by taking the examples of two transfer instructions, this invention is effective not only for the transfer instruction, but also for various instructions such as add or subtract, etc. For this reason, the size of the microprogram in the ROM 4 for microprogram can be reduced to a considerable extent.

As described above, in accordance with the microprocessor according to this invention, when the register code subject to designation is held in the instruction register, the first logic level is outputted from the instruction code decoder, and when the register subject to designation is the instruction queuing register in which the subsequent instruction code is held, the second logic level is outputted. In addition, by the operation of the logic switching means, when the first logic level is being outputted, the register select code decoder can select the data register to give a designation or instruction, while when the second logic level is being outputted, it can select the instruction queuing register to give a designation or instruction. Thus, this eliminates the necessity of making a designation on the microprogram, thus making it possible to reduce the size of a microprogram used.

What is claimed is:

1. A microprocessor comprising:
   means for inputting an instruction code;
   an instruction register for receiving and holding said instruction code from said inputting means;
   an instruction code decoder, responsive to said instruction code held in said instruction register,
     for decoding said instruction code to produce a decoded instruction,
     for outputting a first logic level when said instruction code includes a designation of a register code for a data register, and
     for outputting a second logic level when said instruction code designates an output from an instruction queuing register;
   an instruction processing unit for executing said decoded instruction from said instruction code decoder;
   a ROM unit for storing microprograms including a microprogram for generating a microcode corresponding to said instruction code;
   a microcode decoder for decoding said microcode from said ROM unit to produce a signal indicative of said microcode;
   logic switching means, responsive to said signal from said microcode decoder and to said first and second logic levels from said instruction code decoder,
     for providing a first designation for said data register when said instruction code decoder outputs said first logic level, and
     for producing a second designation for said instruction queuing register when said instruction code decoder outputs said second logic level;
   a plurality of data registers for outputting data to a data bus;
   a register select code decoder, responsive to said first designation from said logic switching means, for selecting one data register of said data registers to output data to said data bus when said instruction code in said instruction register includes said designation of said register code for said one data register;
   an instruction queuing register, responsive to said second designation from said logic switching means, for providing said output to said data bus when said instruction code designates said output.

2. A microprocessor as set forth in claim 1, wherein said logic switching means comprises logic gate circuits.

3. A microprocessor as set forth in claim 1, wherein:
   said logic switching means comprises a first AND circuit and a second AND circuit,
   said microcode decoder outputting a third logic level which indicates presence of a designation for a register according to a microprogram from said ROM unit,
   said first AND circuit being provided with said signal and said first logic level from said instruction decoder as inputs,
   said second AND circuit being provided with said signal and said second logic level from said instruction decoder as inputs,
   said first designation being provided to said register select code decoder by a logic output of said first AND circuit, and
   said second designation being provided to said instruction queuing register by a logic output of said second AND circuit.

4. A microprocessor as set forth in claim 1, wherein said microcode decoder outputs the same microcode for both instruction codes corresponding to said first and second logic levels, one of said logic levels providing a transfer designation to said register select code decoder for a data register corresponding to said register code of said instruction code in said instruction register, and another of said logic levels providing a transfer designation for said instruction queuing register for data of an instruction code subsequent to said instruction code held in said instruction register.

* * * * *